United States Patent [19]

Isobe

[11] Patent Number: 5,405,679
[45] Date of Patent: Apr. 11, 1995

[54] MAGNETIC RECORDING MEDIUM COMPRISING A NON MAGNETIC UNDERLAYER AND TWO MAGNETIC LAYERS OF SPECIFIED COMPOSITION AND THICKNESS

[75] Inventor: Ryosuke Isobe, Hino, Japan

[73] Assignee: Konica Corporation, Japan

[21] Appl. No.: 148,904

[22] Filed: Nov. 8, 1993

[30] Foreign Application Priority Data

Nov. 16, 1992 [JP] Japan .................................. 4-305570

[51] Int. Cl.⁶ .............................................. G11B 5/00
[52] U.S. Cl. ..................................... 428/212; 428/213; 428/215; 428/323; 428/694 BM; 428/694 BS; 428/900
[58] Field of Search ................ 428/212, 213, 215, 323, 428/694 BM, 694 BS, 900

[56] References Cited

U.S. PATENT DOCUMENTS

| | | | |
|---|---|---|---|
| 4,963,433 | 10/1990 | Ogawa et al. | 428/323 |
| 5,156,908 | 10/1992 | Araki et al. | 428/323 |
| 5,268,206 | 12/1993 | Komatsu et al. | 427/548 |

*Primary Examiner*—Stevan A. Resan
*Attorney, Agent, or Firm*—Jordan B. Bierman; Bierman and Muserlian

[57] ABSTRACT

A magnetic recording medium is disclosed, which comprises a no-magnetic support having thereon, at least two magnetic layer including a first magnetic layer provided at the farthest position from the support, and a second magnetic layer provided between the first magnetic layer and the support, and a non-magnetic layer provided between the second magnetic layer and the support. In the above, at least one of the magnetic layers comprises a ferromagnetic metal powder. The magnetic layers have a thickness of not thicker than 0.3 μm in total, and the non-magnetic layer has a thickness within the range of from, 0.2 μm to 2.0 μm.

9 Claims, 3 Drawing Sheets

MAGNETIC RECORDING MEDIUM COMPRISING A NON MAGNETIC UNDERLAYER AND TWO MAGNETIC LAYERS OF SPECIFIED COMPOSITION AND THICKNESS

FIELD OF THE INVENTION

The present invention relates to a magnetic recording medium, particularly to a magnetic recording medium excellent in electrical properties and running durability and useful as an analogue or digital recording medium, particularly as a digital recording medium.

BACKGROUND OF THE INVENTION

There so far has been proposed a magnetic recording medium of double-layered structure which comprises an upper layer containing a magnetic powder and a lower layer containing a non-magnetic powder such described as in Japanese Pat. O.P.I. Pub. Nos. 187418/1988, 191315/1988, for the purpose of improving the electromagnetic conversion property of a magnetic recording medium.

However, these magnetic recording media were not primarily intended to be used as digital recording media, and, though they have the double-layered structure, the thickness of their upper layer is relatively thick; therefore, the loss in properties resulting from layer thickness and self-demagnetization becomes larger. This makes it difficult to obtain an adequate electromagnetic conversion property and running durability required of a digital recording medium.

That is, in a digital recording medium having a capability of high density recording, when high playback outputs in high frequency area are brought about by fortification of coercive force and smoothing of medium surface, playback outputs in low frequency area such as control signals become insufficient. Though playback outputs can be enhanced in both frequency areas by making the coercive force in the upper magnetic layer high and that in the lower magnetic layer low, this inevitably increases the thickness of the lower layer, causing undesired problems in overwriting property.

When the thickness of the magnetic layer is thinned and a non-magnetic layer is provided at the lower position to improve the overwriting property, other necessary properties in both high and low frequency areas are lost again. Further, improvement in high frequency properties by single use of a hexagonal barium ferrite magnetic powder brings about deterioration in low frequency property and overwriting property.

As described above, attempts to give well-balanced desirable properties to a digital recording medium do not easily succeed because of antagonism between reciprocal factors.

SUMMARY OF THE INVENTION

Accordingly, the object of the present invention is to provide a digital recording medium which is
(1) capable of making high-density recording and high in playback output in high frequency area,
(2) high in playback in low frequency area, too,
(3) excellent in overwriting property, and
(4) high in running durability, and to contribute to the improvement of the analogue recording medium at the same time.

The magnetic recording medium of the invention is a magnetic recording medium comprising a non-magnetic support, at least two magnetic layers including a first magnetic layer, or the uppermost layer, provided at the farthest position from the support, and a second magnetic layer, or the lower layer, provided between the first magnetic layer and the support, and a non-magnetic layer provided between the second magnetic layer and the support, in which at least one of the magnetic layers comprises a ferromagnetic metal powder, the magnetic layers have a thickness of not thicker than 0.3 $\mu$m in total, and the non-magnetic layer has a thickness within the range of from 0.2 $\mu$m to 2.0 $\mu$m.

Further in a preferable embodiment of the invention, the coercive force of the uppermost magnetic layer is 1700 to 2400 Oe, the coercive force of the lower layer is kept in 1600 to 2200 Oe to be lower than that of the uppermost layer, and the difference of the coercive force of the uppermost layer and that of the lower layer is 100 Oe or more. The non-magnetic support preferably contains a needle-shaped non-magnetic powder, and the ferromagnetic metal powder contained at least in one magnetic layer contains Fe, Al and one or more kinds of rare earth elements selected from Sm, Nd, Y and Pr, and the existence ratio of them per 100 parts by weight of Fe atoms is 2 to 10 parts by weight for Al atoms and 1 to 8 parts by weight for the rare earth metal element atoms. In a preferable embodiment of the invention, both of the upper most magnetic layer and the lower layer each comprises a ferromagnetic metal powder.

DETAILED DESCRIPTION OF THE INVENTION

Structure of the Magnetic Recording Medium

Figure 1:
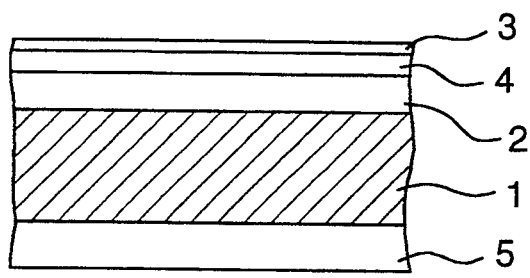
FIGS. 1-(a) and 1-(b) show cross sectional views of magnetic recording media of the invention.
Figure 1:
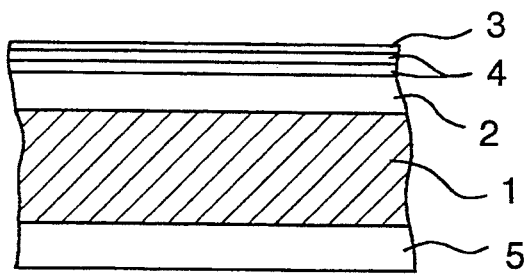

The magnetic recording medium of the invention has, on a non-magnetic support (A), component layers which comprise laminated magnetic layers including the uppermost magnetic layer (B) containing a ferromagnetic powder and, as the lower magnetic layer, at least one magnetic layer (B'), and at least one non-magnetic layer (C) provided between the non-magnetic support and the laminated magnetic layers.

(A) Non-magnetic Support

Preferred materials to form the foregoing non-magnetic support are, for example, a polyester such as polyethylene terephthalate, polyethylene-2,6-naphthalate, a polyolefin such as polypropylene, a cellulosic such as cellulose triacetate, cellulose diacetate, and other thermoplastic resin such as polyamide, aramid, polycarbonate.

The above non-magnetic support is not particularly limited in shapes and mainly used as tapes, films, sheets, discs or drums.

There is no specific restriction on the thickness of the non-magnetic support; the thickness is usually 2 to 100 $\mu$m and preferably 3 to 50 $\mu$m in the case of film or sheet, about 30 $\mu$m to 10 mm for disk-shaped or card-shaped supports, and the thickness of drum-shaped supports is properly selected according to the type of recorder.

The non-magnetic support may be either a single-layered one or a multi-layered one. Further, it may be one subjected to surface treatment such as corona discharge.

In addition, it is preferred that a back coating layer be provided on the reverse side of a non-magnetic support where no magnetic layers are formed, for purposes of improving the running property and antistatic property of the magnetic recording medium and preventing the transfer of recorded information. Moreover, there may also be provided a subbing layer between the magnetic layer and the non-magnetic support.

(B) Magnetic Layer

The laminated magnetic layers contain a magnetic powder, and contain a ferromagnetic metal powder at lest in one layer. It is more preferable that both of the uppermost layer and the lower layer each contain a ferromagnetic metal powder. Further, they may contain a binder or other components when necessary. The total thickness the laminated magnetic layers is 0.3 $\mu$m or less.

The thickness of the uppermost layer is usually 0.01 to 0.27 $\mu$m, preferably 0.02 to 0.25 $\mu$m and more preferably 0.04 to 0.25 $\mu$m.

The above-mentioned total thickness is preferably in the range of 0.1 to 0.3 $\mu$m.

The coercive force (Hc) of the uppermost magnetic layer is preferably 1700 to 2400 Oe. The coercive force of the lower magnetic layer is lower than that of the uppermost magnetic layer and is preferably 1600 to 2200 Oe. Preferable difference between the coercive force ($\Delta$Hc) of the uppermost magnetic layer and that of the lower magnetic layer is 100 Oe or more.

The coercive force of the uppermost magnetic layer and the lower magnetic layer are each can be controlled and set to prescribed value, for example, by choice of magnetic powder having appropriate coercive force and dispersed condition of the magnetic powder in the magnetic paint and oriented condition in the magnetic layer. For instance, a magnetic layer higher in the coercive force can be prepared by use of a magnetic powder having a high Hc value or by making higher dispersed or higher oriented state of the magnetic powder in the paint or the layer.

(B-1) Magnetic Powder

In the invention, at least one of the laminated magnetic layers essentially contains a ferromagnetic metal powder.

The above ferromagnetic magnetic metal powder contains, as its component elements, Fe, Al, and one or more kinds of rare earth elements selected from the group of Bm, Nd, Y and Pr.

Preferably, in the ferromagnetic metal powder used in the invention, the existence ratio of Fe, Al, and one or more kinds of rare earth elements selected from the group of Sm, Nd, Y and Pr in the overall composition is, per 100 parts by weight of Fe, 2 to 10 parts by weight for Al, and 1 to 8 parts by weight for one or more kinds of rare earth elements selected from the group of Sm, Nd, Y and Pr; and the existence ratio of Fe, Al, and one or more kinds of rare earth elements selected from the group of Sm, Nd, Y and Pr at the particle surface of the magnetic powder is, per 100 Fe atoms, 70 to 200 atoms for Al, and 0.5 to 30 atoms for one or more kinds of rare earth elements selected from the group of Sm, Nd, Y and Pr.

More preferably, the ferromagnetic metal powder further contains Na and Ca as component elements, the existence ratio of Fe, Al, one or more kinds of rare earth elements selected from the group of Sm, Nd, Y and Pr, and Na and Ca in the overall composition is, per 100 parts by weight of Fe, 2 to 10 parts by weight for Al, 1 to 8 parts by weight for one or more kinds of rare earth element selected from the group of Sm, Nd, Y and Pr, 0.1 part by weight or less for Na, and 0.1 to 2 parts by weight for Ca; and the existence ratio of Fe, Al, one or more kinds of rare earth elements selected from the group of Sm, Nd, Y and Pr, and Na and Ca at the particle surface is, per 100 Fe atoms, 70 to 200 atoms for Al, 0.5 to 30 atoms for one or more kinds of rare earth elements selected from the group of Sm, Nd, Y and Pr, 2 to 30 atoms for Na, and 5 to 30 atoms for Ca.

Most preferably, the ferromagnetic metal powder furthermore contains Co, Ni and Si as component elements, the existence ratio of Fe, Co, Ni, Al, Si, one or more kinds of rare earth elements selected from the group of Sm, Nd, Y and Pr, and Na and Ca in the overall composition is, per 100 parts by weight of Fe, 2 to 20 parts by weight for Co, 2 to 20 parts by weight for Ni, 2 to 10 parts by weight for Al, 0.3 to 5 parts by weight for Si, 1 to 8 parts by weight for one or more kinds of rare earth element atoms selected from the group of Sm, Nd, Y and Pr, 0.1 part by weight or less for Na, and 0.1 to 2 parts by weight for Ca; and the existence ratio of Fe, Co, Ni, Al, one Dr more kinds of rare earth elements selected from the group of Sm, Nd, Y and Pr, and Na and Ca at the particle surface is, per 100 Fe atoms, 0.1 or less atom for Co, 0.1 or less atom for Ni, 70 to 200 atoms for Al, 0.5 to 30 atoms for one or more kinds of rare earth elements selected from the group of Sm, Nd, Y and Pr, 2 to 30 atoms for Na, and 5 to 30 atoms for Ca.

A high coercive force (Hc) of 1700 Oe or more, a high saturation magnetization of 120 emu/g or more, and an adequate dispersibility, which advantageously bring out the effect of the invention, can be obtained by use of a ferromagnetic metal powder, in which the existence ratio of Fe, Co, Ni, Al, one or more kinds of rare earth elements selected from the group of Sm, Nd, Y and Pr, and Na and Ca in the overall composition, as well as the,existence ratio of Fe, Co, Ni, Al, one or more kinds of rare earth elements selected from the group of Sm, Nd, Y and Pr, and Na and Ca at the particle surface, are within the above ranges.

The content of the ferromagnetic metal powder is usually 60 to 95 wt %, preferably 70 to 90 wt % and especially 75 to 85 wt % of the total weight of solid matters contained in the relevant layer.

Further, the magnetic layer may contain other magnetic powders.

Suitable examples of other magnetic powders are, for example, a ferromagnetic iron oxide powder, a ferromagnetic metal powder and a hexagonal tabular powder.

Among them, preferred are ferromagnetic metal powders described later.

Suitable ferromagnetic iron oxide powders include $\gamma$-Fe$_2$O$_3$, Fe$_3$O$_4$, compounds represented by FeO$_x$ (1.33<x<1.5) which are intermediate iron oxides of the preceding two, and cobalt-modified compounds represented by Co-FeO$_x$ (1.33<x<1.5).

The foregoing ferromagnetic metal powder includes those of which main component is Fe or Co and metallic magnetic powders of which main component is Fe-Al, Fe-Al-Ni, Fe-Al-Zn, Fe-Al-Co, Fe-Al-Ca, Fe-Ni, Fe-Ni-Al, Fe-Ni-Co, Fe-Ni-Si-Al-Mn, Fe-Ni-Si-Al-Zn, Fe-Al-Si, Fe-Ni-Zn, Fe-Ni-Mn, Fe-Ni-Si, Fe-Mn-Zn, Fe-Co-Ni-P, Ni-Co, Fe, Ni, and Co. Of them, Fe type metal powders are superior to the others in electrical properties.

However, when corrosion resistance and dispersibility are taken into consideration, preferred are Fe-Al type ferromagnetic metal powders such as Fe-Al-Ca, Fe-Al-Ni, Fe-Al-Zn, Fe-Al-Co, Fe-Ni-Si-Al-Co and Fe-Co-Al-Ca.

In the embodiment of the invention, especially preferred ferromagnetic metal powders are metal magnetic powders containing iron as the principal component. And it is desirable that these contain Al, or Al and Co, at a weight ratio of Fe:Al=100:0.5 to 100:20 for Al and at a weight ratio of Fe:Ca=100:0.1 to 100:10 for Ca.

Setting the Fe:Al ratio within the above range substantially improves the corrosion resistance; setting the Fe:Ca ratio within the above range enhances the electromagnetic conversion property and decreases the dropout.

The above-mentioned overall composition and the composition at the particle surface can be determined by such methods described as in Example.

It is not clear yet why such an improved corrosion resistance and a reduced dropout are brought about; but, as the reason for this, it can be presumed that improvement in dispersibility contributes to the enhancement of coercive force and minimization of agglomeration.

The major axis of the ferromagnetic powders used in the invention is usually 0.30 $\mu$m or less, preferably 0.04 to 0.20 $\mu$m and more preferably 0.05 to 0.17 $\mu$m. When the major axis is within the above range, there can be improved not only the surface property but the electrical property of the magnetic recording medium.

Further, it is preferred that the coercive force (Hc) of the ferromagnetic powder be within the range of 1600 to 2400 Oe.

For the ferromagnetic powder used in the invention, the saturation magnetization ($\sigma_s$) in the magnetic property, is preferably 70 emu/g or more. Particularly, in case of this ferromagnetic powder being a ferromagnetic metal powder, the quantity of saturation magnetization is preferably 120 emu/g or more.

In the embodiment of the invention, a ferromagnetic metal powder having a specific surface area of 30 m$^2$/g or more, preferably 45 m$^2$/g or more, measured by the BET method is advantageously used as the recording density becomes higher.

The specific surface area and the measuring method thereof are described in detail in J. M. Dallavelle and Clyeorr Jr., Measurement of Powder, (a Japanese version by Muta et al. is published by Sangyo Tosho Co., Ltd.). These are also described in Kagaku Binran, Oyo Hen (Chemical Handbook, Volume on Application), Edited by Chemical Society of Japan, published by Maruzen Co., Ltd. (1966) pp. 1170–1171.

In one example of measuring the specific surface area, a sample powder is subjected to deaeration at about 105° C. for 13 minutes to remove adsorbed matters. After placing it in a measuring apparatus, the initial nitrogen gas pressure is set at 0.5 kg/m$^2$, and measurement is made for 10 minutes by use of nitrogen gas at the temperature of liquid nitrogen ($-105°$ C.).

A Quantasorp (product of Yuasa Ionix Co., Ltd.), for example, is used as the measuring apparatus.

In the invention, the ratio of the major axis (a) of ferromagnetic powder particles contained in the magnetic layer to the major axis (b) of non-magnetic powder particles contained in the non-magnetic lower layer (axial ratio: b/a) is desirably 3 or less, more desirably 2.5 or less, and most desirably 2 or less. Excellent properties including a high surface property can be obtained in the magnetic recording medium by keeping the axis ratio within the above range.

The above magnetic powders may be used singly or in combination of two or more kinds.

(B-2) Binder

Typical examples of the binder used in the magnetic layer include polyurethanes, polyesters and vinyl chloride type resins such as vinyl chloride copolymers. Preferably, these resins contain a repeating unit having at least one polar group selected from —SO$_3$M, —O-SO$_3$M, —COOM, —PO(OM$^1$)$_2$ and sulfobetain group.

In the above polar groups, M represents a hydrogen atom or an alkali metal atom such as Na, K or Li, and M$^1$ represents a hydrogen atom, an alkali metal atom such as Na, K or Li, or an alkyl group.

The above polar groups have a function to enhance the dispersibility of a magnetic powder and contained in these resins in amounts of 0.1 to 8.0 mol% preferably 0.2 to 6.0 mol%. The weight average molecular weight of these resins is preferably in the range of 15,000 to 50,000.

The content of the binder is usually 8 to 25 parts by weight, preferably 10 to 20 parts by weight per 100 parts by weight of ferromagnetic metal powder.

The binder may be used singly or in combination of two or more kinds. In such a combined use, the ratio of polyurethane and/or polyester to vinyl chloride type resin is usually 90:10 to 10:90, preferably 70:30 to 30:70 by weight.

The polar-group-containing vinyl chloride copolymer resins can be synthesized, for example, by addition reaction of a hydroxyl-group-containing copolymer, such as a vinyl chloride-vinyl alcohol copolymer, with a compound having the above-mentioned polar group and a chlorine atom.

A number of methods for introducing a polar group into a vinyl chloride type copolymer are disclosed, for example, in Japanese Pat. O.P.I. Pub. Nos. 44227/1982, 108052/1983, 8127/1984, 101161/1985, 235814/1985, 23830/1985, 238371/1985, 121923/1988, 146432/1988, 146433/1988. These can be utilized in the embodiment of the invention.

The polyester used in the invention can be prepared by reaction of a polyol with a polybasic acid.

Further, the polyester having a polar group can also be synthesized according to a conventional method.

The polyurethane can be prepared by reaction between a polyol and a polyisocyanate.

As such a polyol, a polyester polyol prepared by reacting a polyol with a polybasic acid is employed.

Accordingly, a polyurethane having a polar group can be synthesized by use of a polyester polyol having a polar group as a starting material.

Various techniques to introduce a polar group into a polyurethane, which are applicable to the invention, can be seen, for example, in Japanese Pat. Exam. Pub. No. 41565/1983, Japanese Pat. O.P.I. Pub. Nos.

92422/1982, 92423/1982, 8127/1984, 5423/1984, 5424/1984, 121923/1987.

In the invention, the following resins can be jointly used with the above binders in amounts not more than 50 wt % of the total binder.

Preferred are those having a weight average molecular weight of 10,000 to 200,000. Examples thereof include vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyrals, cellulose derivative such as nitrocellulose, styrene-butadiene copolymers, phenolic resins, epoxy resins, urea resins, melamine resins, phenoxy resins, silicone resins, acrylic resins, urea-formaldehyde resins, and synthetic rubber type resins.

(B-3) Other Components

In the invention, there can be used, as other ingredients, various additives such as abrasive materials, lubricants, durability improvers, curing agents, dispersing agents, antistatic agents and conductive fine particles, for the purpose of improving the quality of the magnetic layer.

As the abrasive material, the conventional abrasive materials described in of Japanese Pat. O.P.I. Pub. No. 14218/1992 can be used.

The average particle size of the abrasive material is usually 0.05 to 0.6 $\mu$m, preferably 0.05 to 0.5 $\mu$m and more preferably 0.05 to 0.3 $\mu$m.

The content of the abrasive material in the magnetic layer is usually 3 to 20 parts, preferably 5 to 15 parts and especially 5 to 10 parts by weight, per 100 parts by weight of the magnetic powder.

Suitable examples of the above lubricants are fatty acids and/or fatty esters. The addition amount of the fatty acid is preferably 0.2 to 10 wt %, especially 0.5 to 5 wt % of the magnetic powder.

The addition amount of the fatty ester is also preferably 0.2 to 10 wt % especially 0.5 to 5 wt % of the magnetic powder When a fatty acid and a fatty ester are jointly used for high lubricating properties, the ratio of fatty acid to fatty ester is preferably 10:90 to 90:10 by weight.

Either a monobasic acid or a polybasic acid can be used as the fatty acid; the number of carbon atoms contained is preferably 6 to 30 and especially 12 to 22.

Preferred examples of the fatty acid include those described in Japanese Pat. O.P.I. Pub. No. 214218/1992.

Preferred examples of the fatty ester include those described in Japanese Pat. O.P.I. Pub. No. 214218/1992.

There may also be used conventional compounds as lubricants other than the above fatty acids and fatty esters; examples thereof are, for example, silicone oils, carbon fluorides, fatty amides and $\alpha$-olefin oxides.

The above curing agents includes polyisocyanates, such as aromatic polyisocyanates including tolylene diisocyanate (TDI) adducts of active hydrogen compounds and aliphatic polyisocyanates including hexamethylene diisocyanate (HMDI) adducts of active hydrogen compounds. Preferably, the weight average molecular weight of such polyisocyanates is in the range of 100 to 3,000.

Suitable examples of the above dispersing agent include the compounds described in Japanese Pat. O.P.I. Pub. No. 214218/1992. These dispersing agents are employed in amounts usually from 0.5 to 5 wt % of the magnetic powder.

Suitable examples of the above antistatic agent include the surfactants described in Japanese Pat. O.P.I. Pub. No. 214218/1992. These antistatic agents are added in amounts of usually 0.01 to 40 wt % of the binder.

Further, electric conductive fine powders can be advantageously used as antistatic agents in the embodiment of the invention. Preferred are carbon black, graphite, tin oxide, silver powder, silver oxide, silver nitrate, organic silver compounds, metal powders such as copper powder, zinc oxide, barium sulfate, and metallic oxide pigments having a surface coating of conductive material such as a tin oxide coating or a coating of antimony solid solution of tin oxide.

The average particle size of the above conductive fine powders is usually 5 to 700 nm, preferably 5 to 200 nm.

The content of the conductive fine powders is usually 1 to 20 parts by weight, preferably 2 to 7 parts by weight per 100 parts by weight of the magnetic powder.

(C) Non-magnetic Layer

The non-magnetic layer is composed at least of one layer and formed in single-layered structure or in multi-layered structure between the non-magnetic support and the laminated magnetic layers.

The non-magnetic layer may be formed of a single kind of layer or a combination of multiple kinds of layers and is not particularly limited in layer configuration. For example, it may be composed of a non-magnetic layer containing a non-magnetic powder (C-1), a layer containing a high magnetic permeable material (C-2), or a combination of these layers. In the invention, a non-magnetic layer (C-1) is preferred, and a non-magnetic layer containing a needle-shaped non-magnetic powder is particularly preferred.

The thickness thereof is usually 0.2 to 2.0 $\mu$m, preferably 0.2 to 1.0 $\mu$m.

(C-1) Non-magnetic Layer

The non-magnetic layer contains a non-magnetic powder and, if necessary, a binder and other ingredients, too.

(C-1-1) Non-magnetic Powder

In embodying the invention, a variety of conventional non-magnetic powders can be used fittingly.

Such non-magnetic powders include, for example, carbon black, graphite, $TiO_2$, barium sulfate, ZnS, $MgCO_3$, $CaCO_3$, ZnO, CaO, tungsten disulfide, molybdenum disulfide, boron nitride, MgO, $SnO_2$, $SiO_2$, $Cr_2O_3$, $\alpha\text{-}Al_2O_3$, $\alpha\text{-}Fe_2O_3$, $\alpha$-FeOOH, SiC, cerium oxide, corundum, artificial diamond, $\alpha$-ion oxide, garnet, silica rock, silicon nitride, silicon carbide, molybdenum carbide, boron carbide, tungsten carbide, titanium carbide, diatom earth and dolomite.

Preferred among them are inorganic powders such as carbon black, $CaCO_3$, $TiO_2$, barium sulfate, $\alpha\text{-}Al_2O_3$, $\alpha\text{-}Fe_2O_3$, $\alpha$-FeOOH and $Cr_2O_3$.

In a preferred embodiment of the invention, non-magnetic powders comprising needle-shaped particles are employed. Using such needle-shaped powders improves not only the surface smoothness of the non-magnetic layer but the surface smoothness of the uppermost layer of the magnetic layer laminated thereon.

The major axis of the non-magnetic powder particles is usually 0.50 $\mu$m or less, preferably 0.40 $\mu$m or less and more preferably 0.30 $\mu$m or less.

The minor axis of the non-magnetic powder particles is usually 0.10 μm or less, preferably 0.08 μm or less and more preferably 0.06 μm or less.

The axial ratio of the non-magnetic powder is usually 2 to 20, preferably 5 to 15 and more preferably 5 to 10. The term axial ratio used here refers to the ratio of major axis to minor axis (major axis/minor axis).

The specific surface area of the non-magnetic powder is usually 10 to 250 m$^2$/g, preferably 20 to 150 m$^2$/g and more preferably 30 to 100 m$^2$/g.

In the embodiment of the invention, use of a non-magnetic powder having the major axis, minor axis, axial ratio and specific surface area each specified as above produces favorable results, because the surface smoothness of the non-magnetic layer as well as that of the uppermost magnetic layer can be brought into a desirable state.

Further, it is preferred that the non-magnetic powder be subjected to surface treatment which uses a Si compound and/or an Al compound. Using such a surface-treated non-magnetic powder improves the surface smoothness of the magnetic layer as the uppermost layer. The content of the above Si and/or Al is preferably 0.1 wt % of the non-magnetic powder for Si, and 0.1 to 10 wt % for Al.

The content of the non-magnetic powder in the non-magnetic layer is usually 50 to 99 wt %, preferably 60 to 95 wt % and more preferably 70 to 95 wt % of the total amount of non-magnetic layer components. By keeping the content of the non-magnetic powder within the above range, the surface state can be made better in both uppermost magnetic layer and non-magnetic layer.

(C-1-2) Binder

As binders used in the non-magnetic layer, the resins illustrated in the paragraph of (B-2) can be used in amounts usually from 5 to 150 parts by weight, preferably from 10 to 120 parts by weight per 100 parts by weight of non-magnetic powder.

(C-1-3) Other Components

As the other ingredients contained in the non-magnetic layer which forms the lower layer, the compounds illustrated in the paragraph of (B-3) can be used. The addition amount is not particularly limited within the range harmless to the effect of the invention.

Cross sectional views of the recording medium of the invention made up as described above are shown in FIGS. 1-(a) and 1-(b). In these figures, 1 is the non-magnetic support, 2 is the non-magnetic layer, 3 is the uppermost magnetic layer, 4 is the lower magnetic layer and 5 is the back coat layer.

MANUFACTURE OF THE MAGNETIC RECORDING MEDIUM

In the manufacture of the magnetic recording medium of the invention, it is preferred that the magnetic layer be formed by the so-called wet-on-wet method in which coating is made while a lower layer is wet. This wet-on-wet method can be performed by a proper adoption of a general method for manufacturing a multi-layered magnetic recording medium.

In such a general method of forming magnetic layers, a mixture of magnetic powder, binder, dispersing agent, lubricant, abrasive material, antistatic agent and solvent is kneaded to prepare a concentrated magnetic paint, and the resultant concentrated magnetic paint is diluted into a magnetic paint. The magnetic paint thus obtained is coated on the surface of a non-magnetic support.

As the above solvent, those described in Japanese Pat. O.P.I. Pub. No. 214218/1992, for example, can be employed.

In kneading and dispersing a mixture of magnetic layer components, a variety of kneaders can be used.

Examples of suitable kneaders and dispersers include those described in Japanese Pat. O.P.I. Pub. No. 214218/1992. Among them, those which can supply a power consumption load of 0.05 to 0.5 KW per kg of magnetic powder are pressure kneaders, open kneaders, continuous kneaders, two-roll kneaders and three-roll kneaders.

Figure 2:
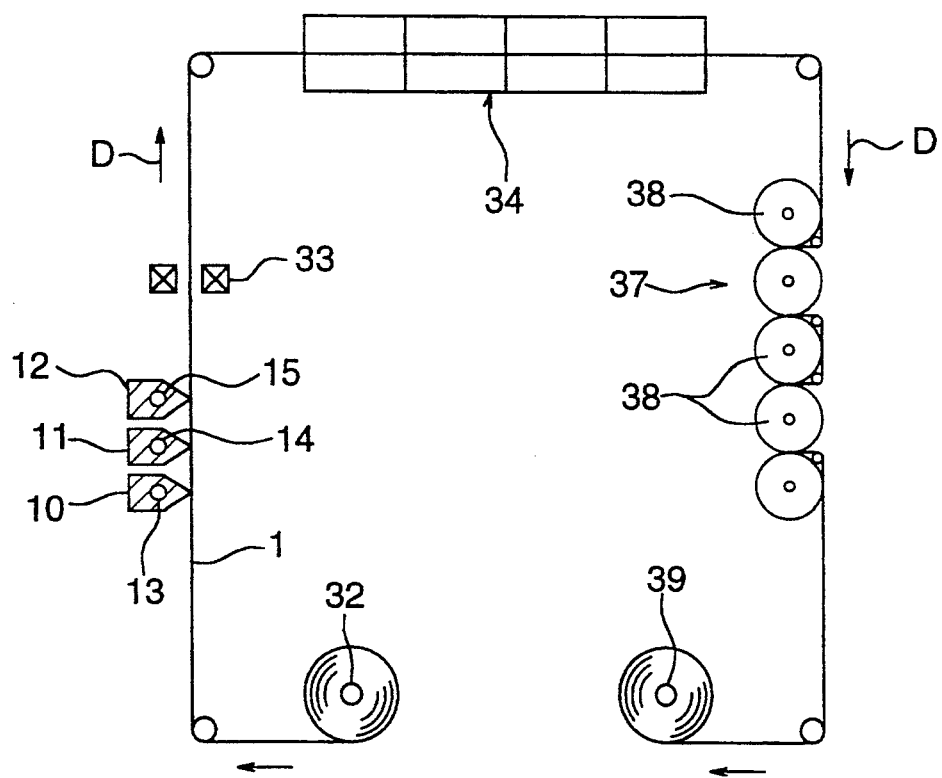
FIG. 2 is a schematic diagram illustrating double-layer coating of magnetic layers in wet-on-wet mode.

FIG. 2 is a schematic diagram showing the procedure for coating an uppermost magnetic layer and a other two lower layers. In the diagram, an uppermost layer magnetic paint, a lower layer magnetic paint and a non-magnetic layer paint are multi-layeredly coated, in wet-on-wet mode, on non-magnetic support 1 fed from feed roll 32 with extrusion coaters 10, 11 and 12, the coated non-magnetic support 1 is allowed to pass between orienting magnets or vertically orienting magnets 33 and led to dryer 34, where it is dried with hot air blown from nozzles arranged up and down. The dried non-magnetic support 1 is fed to supercalender 37 composed of calender rolls 38 and, after being calendered there, it is wound up on wind-up roll 39. The magnetic film thus prepared is cut into tapes to obtain, for example, 8-mm wide magnetic tapes for video recording.

In the above procedure, the paints may be fed to extrusion coaters 10, 11 and 12, respectively, through unillustrated in-line mixers. In the diagram, the arrow shows the direction in which the non-magnetic support is conveyed. Extrusion coaters 10, 11 and 12 have respective paint reservoirs 13 and 14 to apply the paints in wet-on-wet mode; that is, the upper layer paint is applied immediately after coating the lower layer paint (while it is wet).

Figure 3:
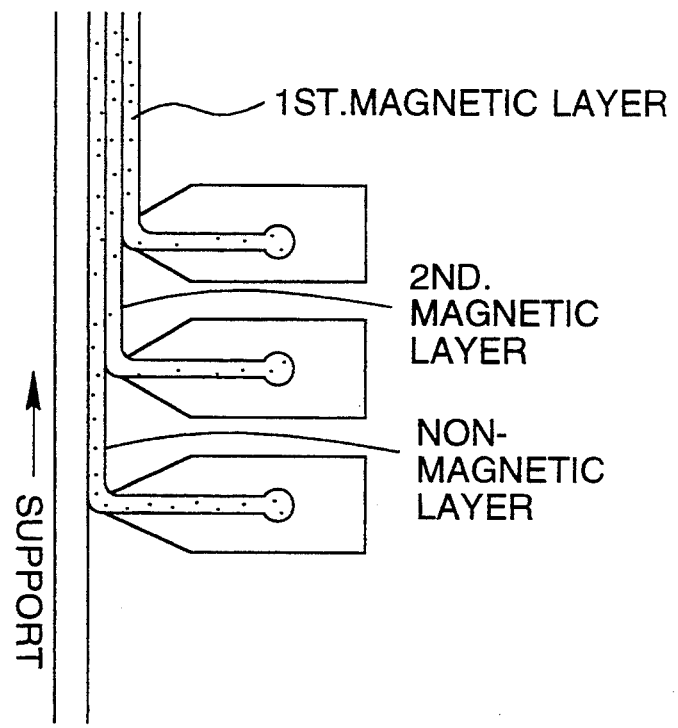
FIGS. 3-(a), 3-(b) and 3-(c) show examples of extrusion coaters for magnetic paints.
Figure 3:
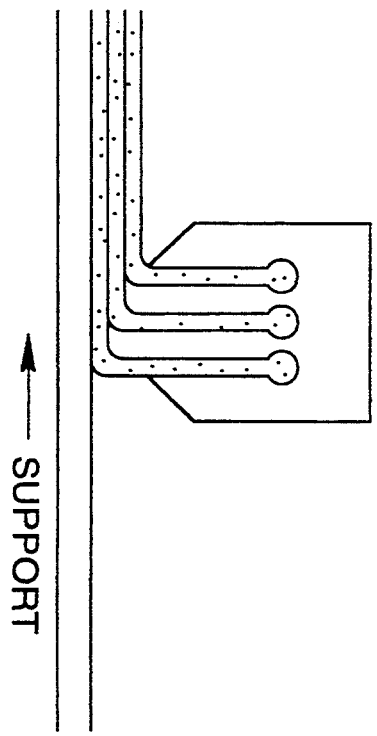
Figure 3:
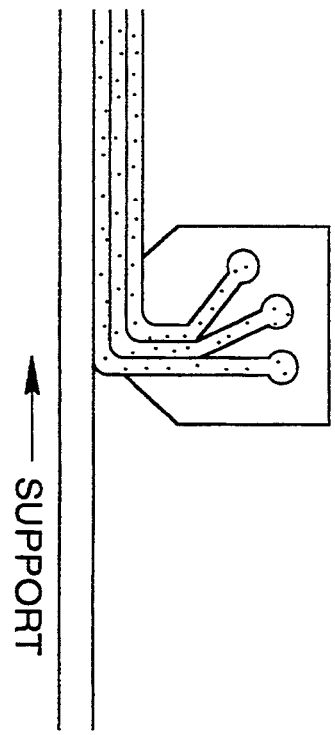

Besides the pair of extrusion coaters shown in FIG. 3-(a), the extrusion coaters shown in FIG. 3-(b) and 3-(c) can also be used in the invention. Of them, preferred is that shown in FIG. 3-(c). In coating, the lower layer paint and upper layer paint are co-extruded from these extrusion coaters to apply multi-layeredly.

As solvents compounded in the above paints or diluent solvents used in coating of the paint, those described in Japanese Pat. O.P.I. Pub. No. 214218,/1992 can be used. These can be used either singly or in combination of two or more kinds.

The magnetic field of the above orienting magnets or vertically orienting magnets is about 20 to 10,000 gauss, the drying temperature at the dryer is about 30° to 120° C., and the drying time is about 0.1 to 10 min.

In performing wet-on-wet coating, there can by used a combination of a reverse roll and an extrusion coater, or a combination of a gravure roll and an extrusion coater. Further, there may also be used a combination of an extrusion coater with an air-doctor coater, a blade coater, an air-knife coater, a squeeze coater, a dip coater, a transfer coater, a kiss coater, a cast coater or a spray coater.

In this wet-on-wet coating, the upper layer is coated on the lower layer while the lower is wet. Accordingly, the surface of the lower layer (the interface with the upper layer) is kept smooth; therefore, the surface property of the upper layer becomes better and, in addition, the adhesion between the upper and lower layers is enhanced. As the result, properties required of a magnetic tape, such as high output and low noise which are essential to high density recording, can be obtained and, in addition, the durability of a magnetic tape can also be improved because of increased peeling resistance and enhanced coating film strength. Furthermore, wet-on-wet coating decreases dropouts and thereby raises reliability.

Surface Smoothing

In a preferred embodiment of the invention, a surface smoothing treatment is performed by means of calendering.

The magnetic recording medium obtained is varnished or bladed, if necessary, and slitted into tapes.

In the surface smoothing treatment, important calendering conditions are temperature, linear pressure and or calendering speed.

In the invention, it is preferable that the temperature be maintained in the range of 50° to 140° C. the linear pressure in the range of =0 to 1000 kg/cm, and the calendering speed in the range of 2.0 to 1,000 m/min.

In the invention, the total thickness of the magnetic layers after the above surface treatment is controlled to 0.3 μm or less, preferably to 0.1 to 0.3 μm.

EXAMPLES

First, characteristics of the ferromagnetoic powder and non-magnetic powder according to the invention are shown in Tables 1 and 2.

non-magnetic layer paint with a kneader and a sand mill respectively. In these compositions, the kind of ferromagnetic powder: and that of non-magnetic powder were varied as shown in Tables 1 and 2.

| Magnetic Layer Paints | |
|---|---|
| Ferromagnetic powder (see Table 1) | 100 parts |
| Potassium sulfonate-containing vinyl chloride type resin (MR-110 made by Nippon Zeon Co., Ltd.) | 10 parts |
| Sodium sulfonate-containing polyurethane resin (UR-8700 made by Toyobo Co., Ltd.) | 8 parts |
| α-Alumina (0.15 μm) | 1 part |
| Stearic acid | 1 part |
| Butyl stearate | 1 part |
| Cyclohexanone | 100 parts |
| Methyl ethyl ketone | 100 parts |
| Toluene | 100 parts |
| Non-magnetic Layer Paint | |
| Non-magnetic powder | (see Table 2) |
| Potassium sulfonate-containing vinyl chloride type resin (MR-110 made by Nippon Zeon Co., Ltd.) | 12 parts |
| Sodium sulfonate-containing polyurethane resin (UR-8700 made by Toyobo Co., Ltd.) | 8 parts |
| α-Alumina (0.2 μm) | 5 part |
| Carbon black (15 nm) | 10 parts |
| Stearic acid | 1 part |
| Butyl stearate | 1 part |
| Cyclohexanone | 100 parts |
| Methyl ethyl ketone | 100 parts |
| Toluene | 100 parts |

To each of the resultant magnetic layer paints and non-magnetic layer paints was added five parts each of

TABLE 1

<Ferromagnetic Powder>

| Ferro-magnetic Powder No. | Rare Earth Element | | | Properties of Powder | | | | |
|---|---|---|---|---|---|---|---|---|
| | Fe | Composition | Al | Coercive Force (Oe) | Saturation Magnetization (emu/g) | Major Axis (μm) | Crystal size (Å) | Specific Surface Area (m²/g) |
| 1 | 100 | Sm 5 | 5 | 1780 | 125 | 0.15 | 150 | 55 |
| 2 | 100 | Nd 2 | 5 | 1820 | 128 | 0.13 | 145 | 50 |
| 3 | 100 | Y 8 | 2 | 1900 | 120 | 0.14 | 140 | 52 |
| 4 | 100 | Pr 1 | 10 | 1680 | 121 | 0.18 | 160 | 56 |
| 5 | 100 | Nd 4 | 4 | 1870 | 125 | 0.12 | 135 | 59 |
| 6 | 100 | Nd 6 | 5 | 2050 | 130 | 0.09 | 130 | 61 |
| 7 | 100 | Nd 8 | 6 | 2250 | 135 | 0.06 | 130 | 65 |
| 8 | 100 | — 0 | 5 | 1550 | 115 | 0.15 | 155 | 55 |
| 9 | 100 | — 0 | 6 | 1750 | 113 | 0.11 | 160 | 58 |
| 10 | 100 | Nd 4 | 0 | 1950 | 120 | 0.13 | 150 | 55 |
| 11 | | hexagonal Ba-ferrite | | 2000 | 75 | — | — | 45 |
| 12 | | hexagonal Ba-ferrite | | 1800 | 73 | — | — | 40 |

TABLE 2

<Non-magnetic Powder>

| Non-magnetic Powder No. | Powder Kind | Shape | Major Axis (μm) | Specific Surface Area (m²/g) | Surface Treatment | |
|---|---|---|---|---|---|---|
| | | | | | Si Amount used for Surface treatment (%) | Al Amount used for Surface Treatment (%) |
| 1 | α-Fe₂O₃ | needle | 0.20 | 43 | 0.5 | 0.2 |
| 2 | α-Fe₂O₃ | needle | 0.12 | 55 | 0.3 | 0.3 |
| 3 | α-Fe₂O₃ | needle | 0.08 | 70 | 0.2 | 0.4 |
| 4 | α-Fe₂O₃ | sphere | 0.12 | 15 | — | — |
| 5 | Cr₂O₃ | needle | 0.20 | 26 | — | — |
| 6 | TiO₂ | needle | 0.25 | 23 | 0.2 | 0.3 |
| 7 | TiO₂ | sphere | 0.04 | 40 | 0.1 | 0.3 |

And, in the following examples and comparative examples, all "parts" are "parts by weight".

Magnetic layer paints and non-magnetic layer paints were prepared by kneading and dispersing the following compositions for magnetic layer paint and those for polyisocyanate compound (Coronate L made by Nippon Polyurethane Ind. Co., Ltd.).

Examples 1 to 18 and Comparative Examples (1) to (5)

In each of Examples 1 to 18 and Comparative Examples (1) to (5), component layers shown in Table 3 were formed by coating one of the above magnetic layer paints (containing a ferromagnetic powder) and one of the above non-magnetic layer paints (containing a non-magnetic powder) in wet-on-wet mode on a 100-mm thick polyethylene terephthalate film, subjecting the coated film to magnetic orientation while it was wet, drying it, and subjecting it to surface smoothing treatment on a calender.

Evaluation

Determination of Overall Composition of Ferromagnetic Metal Powder

The existence ratio of Fe, Co, Ni, Nd, Si and Al elements in the overall composition of the ferromagnetic powder was determined by measuring the fluorescent X-ray intensity of each element with a wavelength dispersive fluorescent X-ray spectrometer (WDX) and calculating the existence ratio according to the fundamental parameter method.

Next the fundamental parameter method is described.

TABLE 3

| | Uppermost Magnetic Layer | | | 1st Lower Magnetic Layer | | | 2nd Lower Magnetic Layer | | | Non-magnetic Layer | |
|---|---|---|---|---|---|---|---|---|---|---|---|
| | Ferro-magnetic Powder No. | Coating Thickness (μm) | Coercive Force (Oe) | Ferro-magnetic Powder No. | Coating Thickness (μm) | Coercive Force (Oe) | Ferro-magnetic Powder No. | Coating Thickness (μm) | Coercive Force (Oe) | Non-magnetic Powder No. | Coating Thickness (μm) |
| Examples | | | | | | | | | | | |
| 1 | 1 | 0.10 | 1820 | 8 | 0.15 | 1620 | — | — | — | 1 | 1.5 |
| 2 | 2 | 0.15 | 1900 | 8 | 0.10 | 1600 | — | — | — | 2 | 2.0 |
| 3 | 3 | 0.10 | 2000 | 8 | 0.05 | 1630 | — | — | — | 2 | 1.3 |
| 4 | 4 | 0.15 | 1700 | 8 | 0.05 | 1600 | — | — | — | 2 | 1.0 |
| 5 | 5 | 0.05 | 2000 | 9 | 0.20 | 1800 | — | — | — | 3 | 1.3 |
| 6 | 5 | 0.10 | 1950 | 9 | 0.20 | 1800 | — | — | — | 2 | 1.2 |
| 7 | 6 | 0.10 | 2160 | 10 | 0.25 | 2020 | — | — | — | 3 | 1.1 |
| 8 | 6 | 0.10 | 2180 | 9 | 0.10 | 1780 | — | — | — | 2 | 0.3 |
| 9 | 6 | 0.05 | 2230 | 8 | 0.05 | 1630 | — | — | — | 3 | 0.4 |
| 10 | 7 | 0.10 | 2400 | 6 | 0.15 | 2150 | — | — | — | 2 | 1.0 |
| 11 | 7 | 0.20 | 2380 | 6 | 0.10 | 2180 | — | — | — | 2 | 1.1 |
| 12 | 7 | 0.10 | 2400 | 6 | 0.10 | 2200 | 5 | 0.10 | 2000 | 3 | 0.8 |
| 13 | 6 | 0.10 | 2200 | 5 | 0.10 | 2000 | 1 | 0.10 | 1830 | 3 | 1.2 |
| 14 | 11 | 0.10 | 2100 | 5 | 0.15 | 1950 | — | — | — | 3 | 1.2 |
| 15 | 6 | 0.10 | 2180 | 9 | 0.10 | 1780 | — | — | — | 4 | 1.2 |
| 16 | 6 | 0.10 | 2180 | 9 | 0.10 | 1780 | — | — | — | 5 | 1.2 |
| 17 | 6 | 0.10 | 2180 | 9 | 0.10 | 1780 | — | — | — | 6 | 1.2 |
| 18 | 6 | 0.10 | 2180 | 9 | 0.10 | 1780 | — | — | — | 7 | 1.2 |
| Comp. Examples | | | | | | | | | | | |
| (1) | 5 | 0.25 | 1930 | 9 | 0.20 | 1780 | — | — | — | 2 | 1.2 |
| (2) | 5 | 0.10 | 1950 | 9 | 0.10 | 1800 | — | — | — | — | — |
| (3) | 5 | 0.15 | 0950 | — | — | — | — | — | — | 2 | 1.2 |
| (4) | 5 | 0.25 | 1930 | 9 | 2.00 | 1780 | — | — | — | — | — |
| (5) | 11 | 0.15 | 2000 | 12 | 0.15 | 1800 | — | — | — | 2 | 1.2 |

Next, a paint having the following composition was coated on the back side of each polyethylene terephthalate film (opposite with the magnetic layer). After drying, the coated film was calendered under the above mentioned calendering conditions to form a 0.8-μm thick back coating layer. A broad raw magnetic tape was thus obtained.

| | |
|---|---|
| Carbon black (Raben 1035) | 40 parts |
| Barium sulfate (average particle size: 300 μm) | 10 parts |
| Nitrocellulose | 25 parts |
| Polyurethane resin (N-2301 made by Nippon Polyurethane Ind. Co., Ltd.) | 25 parts |
| Polyisocyanate compound (Coronate L made by Nippon Polyurethane Ind. Co., Ltd.) | 10 parts |
| Cyclohexanone | 400 parts |
| Methyl ethyl ketone | 250 parts |
| Toluene | 250 parts |

The raw magnetic tape was slitted into 8-mm wide magnetic tapes as video recording media. For these magnetic recording media, the following evaluation was made, of which results are shown in Table 4.

Measurements of fluorescent X-ray intensity were made with a WDX System 3080 (product of Rigaku Denki Co., Ltd.) under the following conditions:

| | |
|---|---|
| X-ray tube: | Rhodium tube |
| Output | 50 KV, 50 mA |
| Analyzing crystal | LiF for Fe, Co, Ni, Nd, PET for Al, RX-4 for Si |
| Absorber | 1/1 (1/10 for Fe) |
| Slit | Coarse |
| Filter | Out |
| PHA | 15 to 30 for Al, Si, 10 to 30 for Fe, Co, Ni, Nd |
| Counting time | Peak = 40 sec, Background = 40 sec, Two points before and after the peak were measured |

Besides the above apparatus, various apparatus can be used in measuring the fluorescent X-ray intensity.

As reference samples, the following four kinds of metals were used.

Reference sample No. 1: Alloy SRM 1219 made by Analytical Reference Materials International Co., which contains 0.15% C, 0.42% Mn, 0.03% P, 0.55% Si, 0.16% Cu, 2.16% Ni, 15.64% Cr, 0.16% Mo and 0.06% V by weight.

Reference sample No. 2: Alloy SRM 1250 made by Analytical Reference Materials International Co., which contains 37.78% Ni, 0.08% Cr, 0.01% Mo, 16.10% Co and 0.99% Al by weight.

Reference sample No. 3: Magnetic iron oxide powder containing 0.14% Mn, 0.15% P, 0.19% S, 0.36% Si, 3.19% Co, 1.26% Zn, 0.07% Ca and 0.02% Na by weight.

Reference sample No. 4: Ferromagnetic metal powder containing 2.73% Nd by weight.

The contents (wt %) of respective elements in the reference samples 1 and 2 are those shown in the data sheet prepared by the manufacturer, and those in reference samples 3 and 4 are measured values by means of an ICP emission spectrophotometer. In making calculations according to the fundamental parameter method, these values were used as the elemental compositions of the reference samples.

Calculations by the fundamental parameter method were made using a Technos Fundamental Parameter Software Version 2.1 under the following conditions:

| Sample model | Bulk sample |
| --- | --- |
| Balance component sample | Fe |
| Output component | Measured X-ray intensity (KCPS) |
| Analytical unit | Weight % |

The calculated existence ratio (wt %) of respective elements in the overall composition is shown in percentages by weight of elements per 100 parts by weight of Fe atoms to report as determination values.

Determination of Surface Composition of Ferromagnetic Metal Powder

The existence ratio (wt %) of Fe, Co, Ni, Nd, Si and Al elements at the surface of ferromagnetic metal powder particles was determined with an XPS surface analyzer.

The measuring method is described below.

First, an XPS analyzer is set at the following conditions:

X-ray anode: Mg

Resolving : 1.5 to 1.7 eV, Resolving powder is defined as power a half breadth of a pure Ag's 3d5/2 peak.

In the measurement, the so-called adhesive tape should not be used to fix a sample. The type of XPS surface analyzer is not particularly limited, and various types of apparatus can be used. In the invention, a VG Escalab-200R was employed.

Each sample was subjected to narrow scanning in the following measuring range to measure the spectrum of each element. Measurements were made at intervals of 0.2 eV and continued till the integration of counts exceeded the minimum number of counts shown below.

| Element | Measuring Range of Bonding Energy | Minimum Number of Counts |
| --- | --- | --- |
| Fe | 725–705 | 1 million |
| Co | 800–775 | 1 million |
| Ni | 875–850 | 300 thousands |
| Nd | 244–224 | 50 thousands |
| Si | 165–145 | 60 thousands |
| Al | 88–68 | 50 thousands |
| C | 300–280 | 15 thousands |

For these spectra obtained, energy positions are calibrated so as to set the peak position of C at 284.6 eV.

Next, for processing the data on Vamas-SCA-Japan's Common Data Processing System Version 2.3 (hereinafter referred to as Vamas software), the above spectra are transferred, using a software supplied by the apparatus manufacturer, to a computer which can use Vamas software.

The transferred spectra were converted into those in Vamas format using Vamas software and subjected to data processing described below.

Prior to determination, count scales for respective elements are calibrated, and a 5-point smoothing treatment is carried out.

The determination procedure is as follows:

The peak area intensity of each element is measured within the following measuring range with the peak position of element as the center. Then, the percentage by number of atoms was determined for each element using a sensitivity coefficient. The percentage by number of atoms is converted into the number of atoms per 100 Fe atoms to report as a determination value.

| Element | Measuring Range (values from peak position) | Sensitivity Coefficient |
| --- | --- | --- |
| Fe | +7 eV to −6 eV | 10.54 |
| Co | +12 eV to −8 eV | 12.2 |
| Ni | +15 eV to −6 eV | 13.92 |
| Nd | +6 eV to −6 eV | 2.71 |
| Si | +5 eV to −4 eV | 0.855 |
| Al | +4 eV to −4 eV | 0.57 |

Electrical Property (dB) RF Output

RF outputs (dB) at 10, 7 and 0.5 MHz were measured on a Sony 8-mm Video Camera CCDV-900.

Overwriting Property

After recording a 1-MHz signal, a 7-MHz signal was overwritten. Then, the quantity of the 1-MHz signal left unerased was determined as an output ratio to the 7-MHz signal.

Demagnetizing Rate of Tape (%)

A sample tape was stored in an environment of 60° C. and 90% RH for 1 week. Then, the demagnetizing rate (%) of the sample tape was calculated by introducing saturation magnetic flux densities measured before and after the storage ($B_1$ and $B_2$, respectively) into the following equation:

$$\text{Tape demagnetizing rate} = \frac{B_1 - B_2}{B_1} \times 100 \ (\%)$$

Still Life

A color bar signal was recorded in an environment of 0° C. and 10% RH. While the signal was play backed in still mode, the time to decrease the initial output by 2 dB was measured.

TABLE 4

| Examples No. | Output at 10 MHz (dB) | Output at 7 MHz (dB) | Output at 0.5 MHz (dB) | Overwriting Property (dB) | Demagnetizing Rate (%) | Still Life 0C/10% (min) |
| --- | --- | --- | --- | --- | --- | --- |
| 1 | 1.0 | 1.5 | 2.0 | −30 | 8 | >120 |

TABLE 4-continued

| | Output at 10 MHz (dB) | Output at 7 MHz (dB) | Output at 0.5 MHz (dB) | Over- writing Property (dB) | Demag- netizing Rate (%) | Still Life OC/10% (min) |
|---|---|---|---|---|---|---|
| 2 | 1.5 | 1.5 | 1.5 | −28 | 5 | >120 |
| 3 | 2.5 | 2.0 | 1.5 | −40 | 4 | >120 |
| 4 | 1.0 | 1.5 | 1.5 | −35 | 6 | >120 |
| 5 | 2.5 | 2.5 | 2.0 | −30 | 3 | >120 |
| 6 | 2.0 | 2.5 | 2.0 | −27 | 5 | >120 |
| 7 | 2.5 | 2.5 | 2.5 | −38 | 10 | 50 |
| 8 | 2.0 | 2.5 | 2.5 | −40 | 5 | 90 |
| 9 | 2.5 | 3.0 | 3.0 | −48 | 3 | >120 |
| 10 | 3.5 | 3.5 | 2.5 | −32 | 6 | >120 |
| 11 | 4.0 | 3.5 | 3.0 | −30 | 4 | >120 |
| 12 | 4.5 | 4.0 | 3.0 | −36 | 4 | >120 |
| 13 | 3.0 | 3.5 | 3.5 | −30 | 2 | >120 |
| 14 | 3.0 | 3.0 | 3.0 | −31 | 5 | >120 |
| 15 | 1.0 | 2.0 | 2.0 | −36 | 5 | 90 |
| 16 | 1.5 | 2.5 | 2.0 | −38 | 3 | >120 |
| 17 | 2.0 | 2.0 | 1.5 | −36 | 5 | >120 |
| 18 | 1.5 | 1.5 | 1.5 | −34 | 4 | 60 |
| Comp. Examples NO. | | | | | | |
| (1) | 0.5 | 1.0 | 2.0 | −20 | 3 | >120 |
| (2) | −2.0 | −1.0 | 0.0 | −35 | 6 | 10 |
| (3) | 1.5 | 1.5 | 0.0 | −32 | 3 | >120 |
| (4) | 0.5 | 1.0 | 3.0 | −12 | 4 | 100 |
| (5) | 2.5 | 1.5 | −2.0 | −25 | 1 | 40 |

What is claimed is:

1. A magnetic recording medium comprising;
a non-magnetic support having provided thereon,
at least two magnetic layers including a first magnetic layer comprising a magnetic powder and a binder, provided at a position furthest from said support, a second magnetic layer comprising a magnetic powder and a binder provided between said first magnetic layer and said support, and
a non-magnetic layer containing a non-magnetic powder and a binder provided between said second magnetic layer and said support, wherein
said magnetic powder of at least one of said first magnetic layer and said second magnetic layer comprises a ferromagnetic powder comprising 100 parts by weight of Fe, 2 to 10 parts by weight of Al, and 1 to 8 parts by weight of an element selected from the group consisting of Sm, Nd, Y, and Pr,
said at least two magnetic layers having a combined thickness of not more than 0.3 μm, and
said non-magnetic layer having a thickness of 0.2 μm to 2.0 μm.

2. The medium of claim 1, wherein both of said first and second magnetic layers each contains a ferromagnetic metal powder.

3. The medium of claim 1, wherein said first magnetic layer has a coercive force within the range of from 1700 Oe to 2400 Oe, and said second magnetic layer has a coercive force within the range of from 1600 Oe to 2200 Oe and the coersive force of said second magnetic layer is lower than that of said first magnetic layer by 100 Oe or more.

4. The medium of claim 1, wherein said non-magnetic layer contains non-magnetic needle-like shape powder.

5. The medium of claim 1, wherein the thickness of said first magnetic layer is 0.01 to 0.27 μm.

6. The medium of claim 5, wherein the thickness of said first magnetic layer is 0.02 to 0.25 μm.

7. The medium of claim 6, wherein the thickness of said first magnetic layer is 0.04 to 0.25 μm.

8. The medium of claim 1, wherein the total thickness of said magnetic layers is 0.1 μm to 0.3 μm.

9. A magnetia recording medium comprising
a non-magnetic support having thereon,
at least two magnetic layers including a first magnetic layer provided at the farthest position from the support, and a second magnetic layer provided between said first magnetic layer and the support, and
a non-magnetic layer provided between said second magnetic layer and the support, wherein
said at least two magnetic layers have a thickness of 0.1 μm to 0.3 μm in total and both of said at least two magnetic layers each comprises a ferromagnetic metal powder comprising 100 parts by weight of Fe, 2 to 10 parts by weight of Al and 1 to 8 parts by weight of an element selected from Sm, Nd, Y and Pr,
said first magnetic layer has a coercive force of 1700 Oe to 2400 Oe and a thickness of 0.04 to 0.25 μm,
said second magnetic layer has a coercive force of 1600 to 2200 Oe and the coersive force of said second magnetic layer is lower than that of said first magnetic layer by 100 Oe or more, and
said non-magnetic layer has a thickness of 0.2 μm to 2.0 μm.

* * * * *